(12) United States Patent
Fujiki et al.

(10) Patent No.: US 6,716,373 B2
(45) Date of Patent: Apr. 6, 2004

(54) OPTICALLY ACTIVE POLYSILANE, OPTICALLY ACTIVE FILM, AND METHOD OF CONTROLLING OPTICAL CHARACTERISTICS OF SOLID THIN FILM

(75) Inventors: Michiya Fujiki, Ikoma (JP); Masashi Kunitake, Kumamoto (JP); Akihiro Ohira, Kuma-gun (JP)

(73) Assignee: Nara Institute of Science and Technology, Ikoma (JP)

( * ) Notice: Subject to any disclaimer, the term of this patent is extended or adjusted under 35 U.S.C. 154(b) by 0 days.

(21) Appl. No.: 10/299,802

(22) Filed: Nov. 20, 2002

(65) Prior Publication Data

US 2004/0041133 A1 Mar. 4, 2004

(30) Foreign Application Priority Data

Sep. 3, 2002 (JP) ........................................ 2002-257938

(51) Int. Cl.[7] .................................................. G02B 5/00
(52) U.S. Cl. ........................ 252/582; 252/585; 252/588; 106/287.13; 528/10
(58) Field of Search ................................ 252/582, 585, 252/588; 106/287.13; 528/10

(56) References Cited

FOREIGN PATENT DOCUMENTS

| JP | 11158288 A | * | 6/1999 | ............ C08G/77/60 |
|----|------------|---|--------|------------------------|
| JP | 2001146519 A | * | 5/2001 | ............ C08G/77/60 |
| JP | 2001164251 A | * | 6/2001 | ............ C09K/19/40 |

OTHER PUBLICATIONS

Michiya Fujiki, et al. "Computing Handedness: Quantized and Superposed Switch and Dynamic Memory of Helical Polysilylene" J. Am Chem. Soc. vol. 123, No. 26, 2001, pp. 6253–6261.

Michiya Fujiki, "Helix Magic, Thermo–Driven Chiroptical Switching and Screw–Sense Inversion of Flexible Rod Helical Polysilylenes" J. Am. Chem. Soc., vol. 122, No. 14, 2000, pp. 3336–3343.

* cited by examiner

Primary Examiner—Robert Dawson
Assistant Examiner—Marc S. Zimmer
(74) Attorney, Agent, or Firm—Oblon, Spivak, McClelland, Maier & Neustadt, P.C.

(57) ABSTRACT

There is disclosed an optically active polysilane represented by the following general formula:

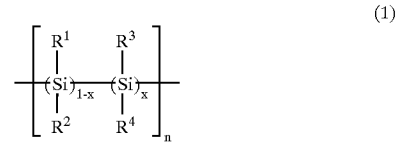

(1)

wherein $R^1$ and $R^2$ are a combination of (R)-3,7-dimethyloctyl group and (S)-3-methylpentyl group, $R^3$ is an alkyl group having 3 to 20 carbon atoms and formed of a branched structure which is branched at any one of the first to fourth carbon atoms positioned away from the backbone chain, $R^4$ is a straight-chain alkyl ether group having 2 to 22 carbon atoms, or a straight-chain alkyl group having 2 to 22 carbon atoms, x is a number ranging from 0.01 to 0.99, and n is a number ranging from 10 to 100,000.

27 Claims, 6 Drawing Sheets

OPTICALLY ACTIVE POLYSILANE, OPTICALLY ACTIVE FILM, AND METHOD OF CONTROLLING OPTICAL CHARACTERISTICS OF SOLID THIN FILM

CROSS-REFERENCE TO RELATED APPLICATIONS

This application is based upon and claims the benefit of priority from the prior Japanese Patent Application No. 2002-257938, filed on Sep. 3, 2002, the entire contents of which are incorporated herein by reference.

BACKGROUND OF THE INVENTION

1. Field of the Invention

This invention relates to an optically active polysilane, an optically active film, and a method of controlling the optical activity of a solid thin film.

2. Description of the Related Art

It is strongly desired, with regard to twenty-first century information communication, to achieve the development of an ultra-miniature recording system which is capable of recording large quantities of digital information in a light-weight recording medium in a convenient and inexpensive manner and at high-speed. In the electric household appliances industries too, in view of the advent of commercial digital broadcasting, digital information recording devices such as digital video recorders, DVD-RAMs, and hard disk magnetic recorders are expected to be rapidly propagated from now onwards.

In the MO system, a minute change of around 0.15° in optical Kerr rotation angle (the angle change of optical activity) occurs due to magneto-optical writing. Therefore, in order to achieve an excellent contrast/noise ratio, it is required to attach a reflecting mirror to the rear side of a recording medium to make it possible to utilize the change of optical Kerr rotation angle that has been amplified to about 0.3° as a result of magneto-optical writing. For the purpose of detecting such a change in rotation angle which is as small as 0.3°, a detection mechanism, which is more accurate and larger in size compared with that of a magnetic head, is needed. The speed of reading/writing according to the MO system is around 30 milliseconds, which is three to five times slower than that of magnetic recording. One of the reasons for this is attributed to the fact that the detection head portion holding the beam splitter is relatively large in weight and size, thereby retarding the speed of the servo-track. Additionally, it is required to provide the recording device with a laser beam source and a magnetic head, thereby limiting miniaturization of the recording device as a whole.

If it is possible to develop a thin film material which is capable of optically writing and reading data as well as optically erasing the data, and also capable of exhibiting a very large change in optical rotatory power, which is much larger than 0.3°, as a result of the writing, it would become possible to take a step forward in realization of an all-optical recording system utilizing optical activity. As a result, it would become possible not only to further miniaturize the recording device but also to perform high-speed writing/recording which comparable with that of a hard disk.

At present, the magneto-optical recording (MO) of an inorganic magnetic thin film and the phase transition recording (PD) of an inorganic thin film are known as being useful as an optical recording material, and storage devices (recording materials) utilizing these principles are commercially available. The storage density in optical reading increases in inverse proportion to the square of the wavelength of laser employed. Therefore, when a short wavelength ultraviolet solid-state laser, for example, a GaN laser element (available from Nichia Kagaku Co., Ltd.) having an oscillation frequency of 370–430 nm in the ultraviolet region (presumed to be a light source of the next generation) is employed, it may be possible to realize a mass storage recording medium whose capacity is several times larger than that of the current DVD-RAM (laser beam source: 635 nm, 650 nm). Furthermore, if it is possible in the future to develop a material which is capable of complying with a laser beam source of much shorter wavelength (for example, a wavelength of 185–215 nm or a double wavelength of the GaN laser), it may be possible to perform high density recording ten times higher than that of current DVD-RAMs (laser beam source: 635 nm, 650 nm).

Meanwhile, an optical network for communication is constituted by a laser beam source (1300 nm, 1550 nm in central wavelength), a detector and an optical fiber forming a low loss window region, with the bandwidth of wavelength thereof being 1300 nm, 1550 nm.

If a material is found which is capable of developing and dissipating a fresh absorption in response to an external impulse in a wide wavelength region covering ultraviolet, visible and near infrared regions, the material is expected to be utilized as an optical recording material.

BRIEF SUMMARY OF THE INVENTION

Therefore, an object of the present invention is to provide an optically active polysilane which is capable of exhibiting signals of large circular dichroism in a highly efficient manner over a wide wavelength region covering ultraviolet, visible and near infrared regions, and to provide an optically active film which can be formed using this polysilane.

Another object of the present invention is to provide a method of controlling the optical activity of a solid thin film relative to a light source selected suitably in conformity with a wide wavelength region covering ultraviolet, visible and near infrared regions.

According to one aspect of the present invention, there is provided an optically active polysilane represented by the following general formula:

(1)

wherein $R^1$ and $R^2$ are a combination of groups selected from (R)-3,7-dimethyloctyl group and (S)-3-methylpentyl group, (S)-3,7-dimethyloctyl group and (R)-3-methylpentyl group, (S)-3,7-dimethyloctyl group and isopentyl group, (R)-3,7-dimethyloctyl group and isopentyl group, (S)-3,7-dimethyloctyl group and 2-ethylbutyl group, (R)-3,7-dimethyloctyl group and 2-ethylbutyl group, (S)-3,7-dimethyloctyl group and 2-cyclopentylethyl group, and (R)-3,7-dimethyloctyl group and 2-cyclopentylethyl group; $R^3$ is an alkyl group having 3 to 20 carbon atoms and formed of a branched structure which is branched at any one of the first to fourth carbon atoms positioned away from the backbone chain; $R^4$ is a straight-chain alkyl ether group having 2 to 22 carbon atoms, or a straight-chain alkyl group having 2 to 22 carbon atoms; x is a number ranging from 0.01 to 0.99; and wherein the number or repeating units in the optically active polysilane as represented by formula (1) ranges from 10 to 100,000.

According to another aspect of the present invention, there is provided an optically active film containing the polysilane represented by the following general formula (1):

wherein $R^1$ and $R^2$ are a combination of groups selected from (R)-3,7-dimethyloctyl group and (S)-3-methylpentyl group, (S)-3,7-dimethyloctyl group and (R)-3-methylpentyl group, (S)-3,7-dimethyloctyl group and isopentyl group, (R)-3,7-dimethyloctyl group and isopentyl group, (S)-3,7-dimethyloctyl group and 2-ethylbutyl group, (R)-3,7-dimethyloctyl group and 2-ethylbutyl group, (S)-3,7-dimethyloctyl group and 2-cyclopentylethyl group, and (R)-3,7-dimethyloctyl group and 2-cyclopentylethyl group; $R^3$ is an alkyl group having 3 to 20 carbon atoms and formed of a branched structure which is branched at any one of the first to fourth carbon atoms positioned away from the backbone chain; $R^4$ is a straight-chain alkyl ether group having 2 to 22 carbon atoms, or a straight-chain alkyl group having 2 to 22 carbon atoms; x is a number ranging from 0.01 to 0.99; and and wherein the number or repeating units in the optically active polysilane as represented by formula (1) ranges from 10 to 100,000.

According to a further aspect of the present invention, there is provided a method of controlling the optical activity of a solid thin film, the method comprising:

forming a thin film containing an optically active polysilane represented by the following general formula (1) and exhibiting a helical inversion on a substrate at a temperature which is low enough to prevent the generation of the helical inversion;

heating the thin film to decrease the intensity of the circularly polarized light of the thin film; and cooling the thin film to increase the intensity of the circularly polarized light of the thin film:

wherein $R^1$ and $R^2$ are a combination of groups selected from (R)-3,7-dimethyloctyl group and (S)-3-methylpentyl group, (S)-3,7-dimethyloctyl group and (R)-3-methylpentyl group, (S)-3,7-dimethyloctyl group and isopentyl group, (R)-3,7-dimethyloctyl group and isopentyl group, (S)-3,7-dimethyloctyl group and 2-ethylbutyl group, (R)-3,7-dimethyloctyl group and 2-ethylbutyl group, (S)-3,7-dimethyloctyl group and 2-cyclopentylethyl group, and (R)-3,7-dimethyloctyl group and 2-cyclopentylethyl group; $R^3$ is an alkyl group having 3 to 20 carbon atoms and formed of a branched structure which is branched at any one of the first to fourth carbon atoms positioned away from the backbone chain; $R^4$ is a straight-chain alkyl ether group having 2 to 22 carbon atoms, or a straight-chain alkyl group having 2 to 22 carbon atoms; x is a number ranging from 0.01 to 0.99; and n is a number ranging from 10 to 100,000.

Additional objects and advantages of the invention will be set forth in the description which follows, and in part will be obvious from the description, or may be learned by practice of the invention. The objects and advantages of the invention may be realized and obtained by the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

It has been found by the present inventors that the compound which is represented by the aforementioned general formula (1) and can be obtained from the copolymerization between an optically active monomer and an optically inactive monomer is excellent in optical characteristics. The copolymer to be obtained in this manner is capable of enabling a helical inversion to take place at a predetermined temperature in a solution, so that the optical characteristics of a solid thin film to be formed from a solution of this copolymer are caused to change depending on the casting temperature thereof. More specifically, the optical activity of a solid thin film obtained through the casting at a temperature higher than the helix inversion temperature is caused to reverse in sign from that of the optical activity of a solid thin film obtained through the casting at a temperature lower than the helix inversion temperature. Furthermore, the solid thin film obtained through casting at a temperature lower than the helix inversion temperature enables the intensity of optical activity to be reversibly changed through repetitions of heating and cooling. The present invention has been accomplished based on the aforementioned findings.

In the aforementioned formula (1), $R^1$ and $R^2$ are a combination of groups selected from (R)-3,7-dimethyloctyl group and (S)-3-methylpentyl group, (S)-3,7-dimethyloctyl group and (R)-3-methylpentyl group, (S)-3,7-dimethyloctyl group and isopentyl group, (R)-3,7-dimethyloctyl group and isopentyl group, (S)-3,7-dimethyloctyl group and 2-ethylbutyl group, (R)-3,7-dimethyloctyl group and 2-ethylbutyl group, (S)-3,7-dimethyloctyl group and 2-cyclopentylethyl group, and (R)-3,7-dimethyloctyl group and 2-cyclopentylethyl group. A first repeating unit comprising the aforementioned $R^1$ and $R^2$ is optically active. The combination of $R^1$ and $R^2$ may be a combination of (S)-3, 7-dimethyloctyl group and isopropyl group, or a combination of (R)-3,7-dimethyloctyl group and isopropyl group, for instance.

In the aforementioned formula (1), $R^3$ is an alkyl group having 3 to 20 carbon atoms and formed of a branched structure. In order to effectively control the helical structure/helical structure inversion characteristics of the copolymer, the alkyl group to be incorporated into the formula as the $R^3$ is required to be formed of a branched structure. Further, in order to obtain a suitable immobilizing effect of the helical inversion structure, the alkyl group is required to be branched at any one of the first to fourth carbon atoms positioned away from the backbone chain. More preferably, the alkyl group is branched at the second carbon atom counted from the backbone chain. If the chain of this $R^3$ is excessively long, the distilling temperature of raw monomer may become very high, thereby rendering the distillation refining very difficult. In order to avoid this inconvenience, the number of carbon atoms should be less than 20. More specifically, this $R^3$ can be selected from isopropyl, isobutyl, 2-ethylbutyl, isopentyl, 2-cyclopentylethyl, etc. Among these, an isobutyl group is especially preferable in view of enabling the helical inversion structure to be effectively controlled through a smaller degree of incorporation ratio of this $R^3$.

The alkyl group or alkyl ether group introduced into the aforementioned general formula (1) is a straight-chain alkyl ether group having 2 to 22 carbon atoms. If the chain of this $R^4$ is excessively long, the distilling temperature of raw monomer may become very high, thereby rendering the distillation refining very difficult. In order to avoid this inconvenience, the number of carbon atoms should be less than 22. Specific examples of the alkyl group are; $C_2H_5$, n-$C_3H_7$, n-$C_4H_9$, n-$C_5H_{11}$, n-$C_6H_{13}$, n-$C_7H_{15}$, n-$C_8H_{17}$, n-$C_9H_{19}$, n-$C_{10}H_{21}$, n-$C_{11}H_{23}$, n-$C_{12}H_{25}$, n-$C_{13}H_{27}$, n-$C_{14}H_{29}$, n-$C_{15}H_{31}$, n-$C_{16}H_{33}$, n-$C_{17}H_{35}$, n-$C_{18}H_{37}$, n-$C_{19}H_{39}$, n-$C_{20}H_{41}$, n-$C_{21}H_{43}$ and n-$C_{22}H_{45}$. As for the alkyl ether group, there is no particular limitation as long as it is formed of a compound containing at least one ether oxygen, specific examples thereof being $(CH_2)_2O(CH_2)_2OC_2H_5$, $(CH_2)_2O(CH_2CH_2O)_2OC_2H_5$, etc.

$R^3$ and $R^4$ may be respectively selected to form a suitable combination thereof. For example, when $R^3$ is isobutyl group, $R^4$ should preferably be 6,9,12-trioxatetradecyl group or decyl group. However, there is no particular limitation with regard to kind of $R^4$, as long as it is fundamentally formed of a straight chain structure.

The second repeating unit comprising the $R^3$ and $R^4$ is optically inactive. It is possible, through the optimization of the composition of a copolymer represented by the aforementioned general formula (1), to alter the intensity of the optical activity of the thin film obtained and to provide the thin film with characteristics such as the inversion of sign. The helix inversion temperature of the copolymer represented by the aforementioned general formula (1) can be non-linearly increased by changing the value of x. For example, the helix inversion temperature of the copolymer represented by the aforementioned general formula (1) in a solution of iso-octane can be controlled to be higher than 2° C. and not higher than 100° C. However, if the ratio of the second repeating unit in the aforementioned general formula (1) is excessively high, the optical activity inversion characteristics of the copolymer as a whole may be prominently damaged or dissipated, thus causing the inversion characteristics of the copolymer to become extremely widened. Therefore, the value of x should preferably be confined to 0.5 or less, more preferably to 0.25 or less.

The n in the aforementioned general formula (1) is in the range of 10 to 1,000,000, more preferably, in the range of 20 to 100,000. If the molecular weight of the compound represented by the aforementioned general formula (1) is too small, the formation of the thin film may become difficult. On the other hand, if the molecular weight of the compound is too large, the solubility of the compound as well as the viscosity of solution may be extremely raised, thereby deteriorating the film-forming property of the compound.

The copolymer represented by the aforementioned general formula (1) can be synthesized by using two kinds of asymmetric substituted dichlorosilane monomers, i.e. $R^1R^2SiCl_2$ and $R^3R^4SiCl_2$ for instance. These dichlorosilane monomers can be synthesized according to the following reaction formulas (i) to (iv).

wherein X is Cl or Br; THF is tetrahydrofuran; $Et_2O$ is diethyl ether; and R' and R" represent $R^1$ and $R^2$ or $R^3$ and $R^4$, respectively.

The present invention will be further explained in detail with reference to the following examples.

EXAMPLE 1

As an optically active polysilicone copolymer, a copolymer (RS-Oxa (95:5)) represented by the following chemical formula was prepared.

This compound was synthesized according to the following procedure.

First of all, the interior of a reaction vessel was sufficiently dehydrated and deaerated, and purged using argon gas. Thereafter, 1.66 g of metallic sodium, 0.3 mL of diglyme (diethylene glycol dimethyl ether), and 12 mL of toluene were introduced into a flask. Then, while keeping the oil bath temperature at 110° C., a mixture containing 8.7 g (95 mol %) of (R)-3,7-dimethyloctyl-(S)-3-methy-pentyl dichlorosilane (MW: 325) and 1.1 g (5 mol %) of 6,9,12-trioxatetradecyl isobutyl dichlorosilane (MW: 359) was dropped little by little into the flask to activate the sodium.

Thereafter, the temperature of oil bath was lowered to 90° C., and the residual portion of the dichlorosilane was dropped all at once into the flask. The reaction time required was three hours.

Thereafter, ethyl alcohol was added to the reaction solution to treat the unreacted sodium to obtain a reaction mixture, which was subsequently washed using ethyl alcohol and water, and subjected to suction filtration, thereby obtaining a white solid product. This solid product was redissolved in toluene to obtain a solution, which was then subjected to filtration to remove insoluble matter. Then, the solution thus filtered was subjected to fractional reprecipitation by using isopropanol and ethyl alcohol, thus refining the product and obtaining a white precipitate, which was then recovered by using a centrifugal separator. The resultant product was dried in a vacuum for 5 hours at a temperature of 90° C. to obtain the desired product weighing 4.5 g. The yield was 46% as reduced to dichlorosilane monomer.

The weight average molecular weight (Mw) of the copolymer (RS-Oxa (95:5)) was found to be $3.4 \times 10^7$, and the distribution of the molecular weight (Mw/Mn) was 50.8. The weight average molecular weight can be suitably selected from the range of 1,000 to $10^8$, more preferably from the range of not larger than $10^7$.

This copolymer was dissolved in iso-octane to prepare a solution of $5.0 \times 10^{-3}$ mol/L, which was then coated on the surface of a quartz substrate by a spin-coating method to form a thin film. As for the solvent employed in this case, it is possible, other than iso-octane, to employ, for instance, benzene, toluene, THF or chloroform. As for the substrate, it is possible to employ, for instance, an ITO substrate, a graphite substrate or an inorganic substrate.

Two temperatures, i.e. 20° C. and 50° C. were selected for the temperature of the substrate, and two temperatures, i.e. 5° C. and 30° C. were selected for the temperature of the casting. The intensity of the circularly polarized light (CD) of the thin film thus obtained is shown in the graph of FIG. 1.

Figure 1:
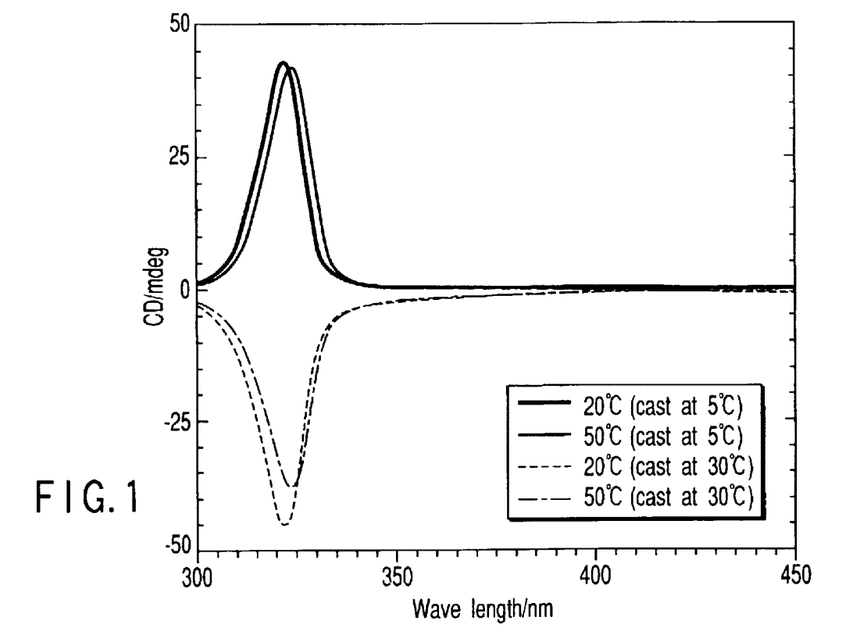
FIG. 1 is a graph illustrating the intensity of the circularly polarized light of a thin film containing a copolymer (RS-Oxa (95:5))

As shown in FIG. 1, when the casting was performed at a temperature of 5° C., a positive Cotton CD absorption band was observed in the vicinity of 320 nm. On the other hand, when the casting was performed at a temperature of 30° C., a negative Cotton CD absorption band was observed in the vicinity of 320 nm. In either cases, the absorption band was not dependent on the temperature of the substrate. It was confirmed through these results that the optical activity of the thin film containing the copolymer (RS-Oxa (95:5)) which was obtained through the casting at a temperature of 5° C. could be reversed in sign from that of the optical activity of the thin film which was obtained through the casting at a temperature of 30° C.

Figure 2:
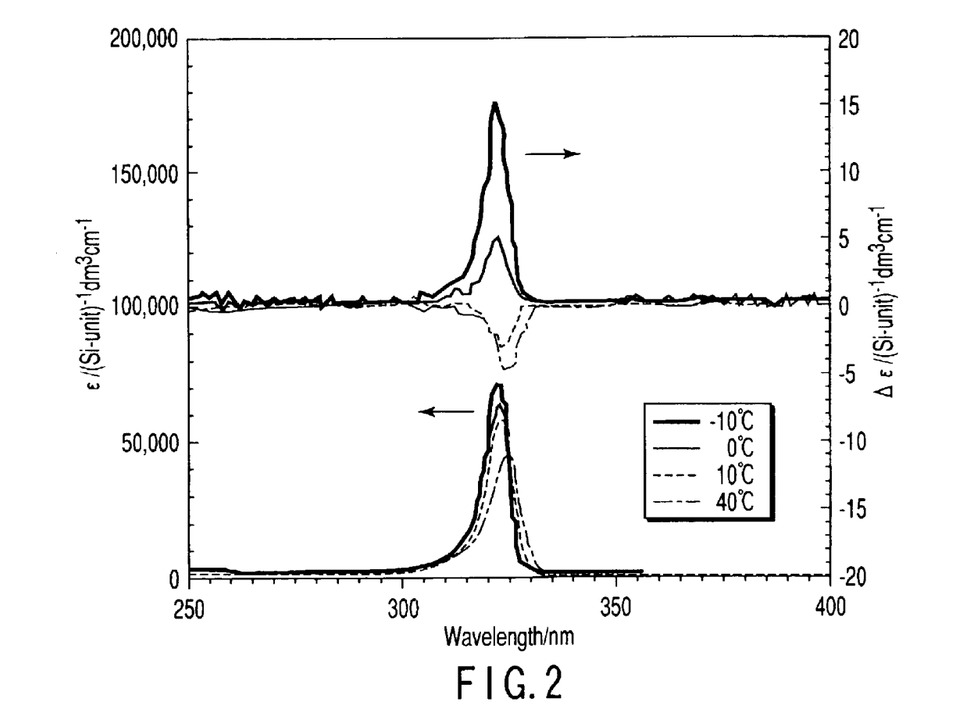
FIG. 2 is a graph showing the ultraviolet absorption spectrum and circular dichroism absorption spectrum of a thin film containing a copolymer (RS-Oxa (95:5))

The graph in FIG. 2 shows the ultraviolet absorption (UV) spectrum and circular dichroism absorption spectrum of the aforementioned iso-octane solution of the compound (RS-Oxa (95:5)). In this graph, the ordinate (left-hand side) "$\epsilon$" represents an absorption coefficient per repeating unit of the monomer, and the ordinate (right-hand side) "$\Delta\epsilon$" represents the intensity of the circular dichroism absorption per repeating unit of the monomer. The concentration of the aforementioned compound in the solution was $2 \times 10^{-5}$ mol/L, and four temperature settings were used; i.e. –10° C., 0° C., 10° C. and 40° C.

As compared with the UV spectrum, the absorption maximum ($\lambda$max) was located in the vicinity of 320 nm when the temperature of the solution was set to –10° C. As the temperature of the solution was raised, the $\lambda$max shifted toward the longer wavelength side. When the temperature of the solution was set to 40° C., $\lambda$max was located in the vicinity of 330 mm, thus indicating that the absorption spectrum of the copolymer (RS-Oxa (95:5)) was highly temperature-dependent in the iso-octane solution, i.e. indicating the thermochromism of the copolymer.

On the other hand, with regard to the circular dichroism absorption spectrum, a positive Cotton CD absorption band was observed in the vicinity of 320 nm when the temperature of the solution was –10° C. and 0° C., and a negative Cotton CD absorption band was observed in the vicinity of 325 nm when the temperature of the solution was 10° C. and 40° C., thus indicating a difference in helical winding property of the copolymer (RS-Oxa (95:5)) between these temperatures.

Figure 3:
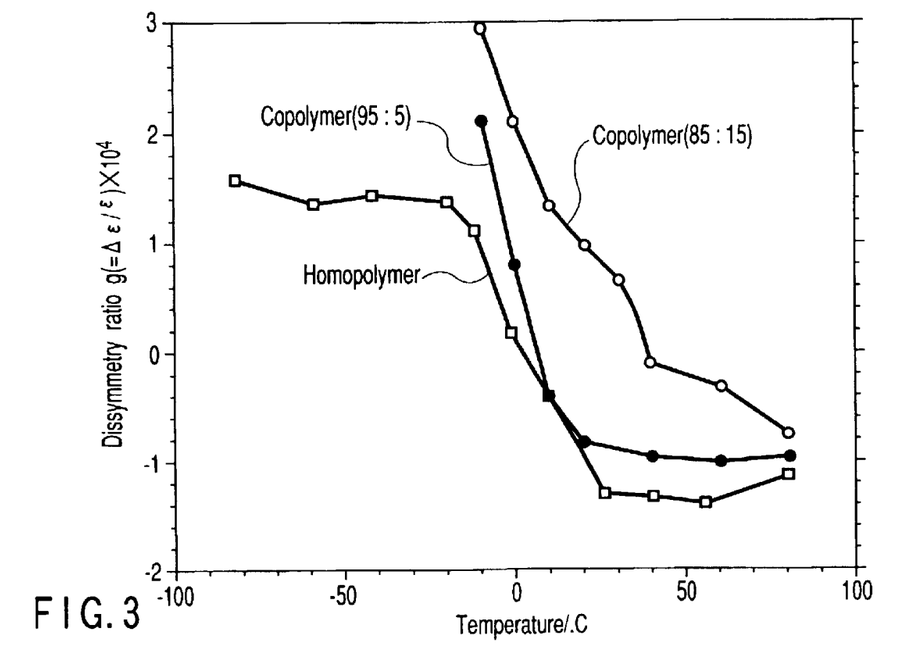
FIG. 3 is a graph illustrating the temperature dependency of an asymmetric factor.

Then, the temperature dependency of an asymmetric factor with regard to an iso-octane solution of the copolymer (RS-Oxa (95:5)) was measured to obtain the results as shown in FIG. 3. FIG. 3 also shows the results obtained from the copolymer (RS-Oxa (85:15)) where the composition was changed to 85:15, as well as the results obtained from RS homopolymer.

Incidentally, the copolymer (RS-Oxa (85:15)) was synthesized in the same manner as that of the copolymer (RS-Oxa (95:5)) except that the molar ratio of the raw material dichlorosilane monomer was changed to 85:15. On the other hand, the RS homopolymer was obtained in the same manner as described above except that 6,9,12-trioxatetradecyl isobulyl dichlorosilane was not employed.

It can be understood from the results shown in FIG. 3 that the asymmetric factor lowered as the temperature became rose. Further, it has been made clear that the temperature which enables the asymmetric factor to become zero changes greatly depending on the composition of the polymer. More specifically, for the copolymer (RS-Oxa (95:5)), the asymmetric factor became zero at temperatures of around 8° C., and for the copolymer (RS-Oxa (85:15)), the asymmetric factor became zero at temperatures of around 38° C. Further, for the RS homopolymer, the asymmetric factor became zero at temperatures of around 2° C. Namely, the helical inversion of each polymer takes place at a temperature specific to each polymer.

As already shown in FIG. 1, the thin film obtained through the casting of a solution of the copolymer (RS-Oxa (95:5)) at a temperature of 5° C. indicated a positive Cotton CD absorption band. On the other hand, the thin film obtained through the casting of a solution of the copolymer at a temperature of 30° C. indicated a negative Cotton CD absorption band. Namely, it is possible, through the casting at a lower temperature than the helical inversion temperature, to invert the sign of the optical activity of the thin film obtained.

Figure 4:
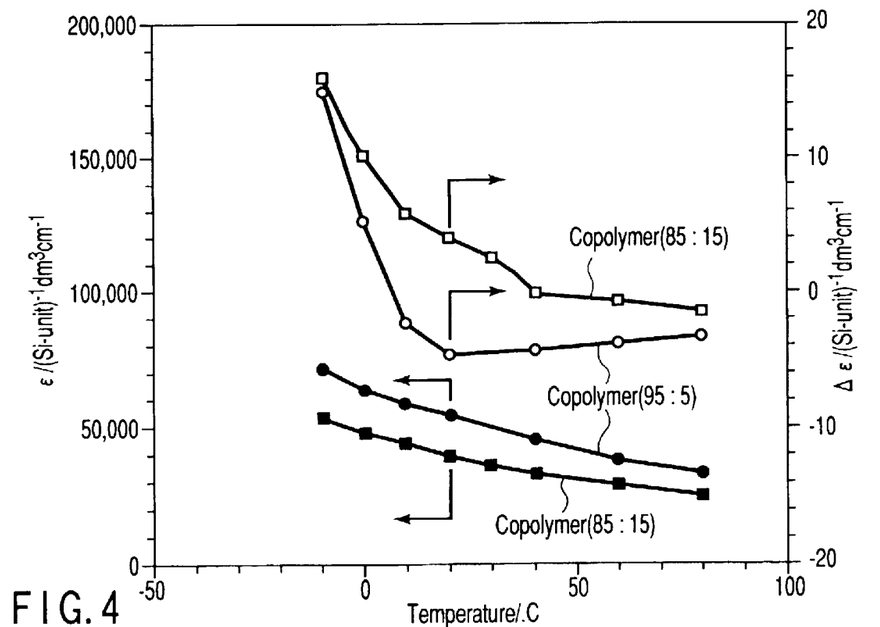
FIG. 4 is a graph illustrating the temperature dependency of the ultraviolet absorption spectrum and circular dichroism absorption spectrum of a thin film.

The copolymers (RS-Oxa (95:5)) and (RS-Oxa (85:15)) were respectively dissolved in iso-octane to prepare a solution of $2 \times 10^{-5}$ mol/L, each of which was then investigated with respect to the temperature dependency of the ultraviolet absorption spectrum and circular dichroism absorption spectrum of each of the solutions, the results being shown in FIG. 4. It can be seen from the results shown in FIG. 4 that the intensity of the ultraviolet absorption as well as the intensity of the circular polarization were inclined to decrease in proportion to the increase in temperature.

Figure 5:
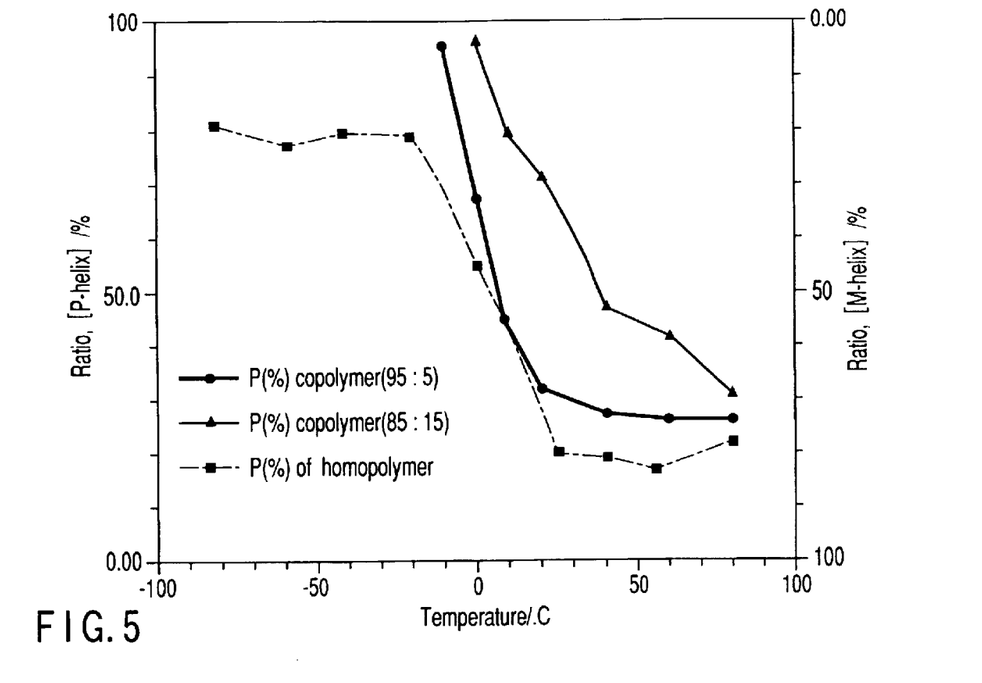
FIG. 5 is a graph illustrating the temperature dependency of the content of a right-hand helical structure and of a left-hand helical structure.

The content of the right-hand helical structure and of the left-hand helical structure in each of the aforementioned copolymers (RS-Oxa (95:5)) and (RS-Oxa (85:15)), and RS homopolymer was found to be dependent on the temperature and fluctuated as shown in the graph of FIG. 5.

EXAMPLE 2

A copolymer (RS-Oxa (85:15)) represented by the following chemical formula was prepared.

(RS-Oxa (85:15))

The weight average molecular weight (Mw) of this copolymer (RS-Oxa (85:15)) was found to be $8.1 \times 10^6$, and the distribution of the molecular weight (Mw/Mn) was 3.61.

This copolymer was dissolved in iso-octane to prepare a solution of $5.0 \times 10^{-3}$ mol/L, which was then coated on the surface of a quartz substrate by a spin-coating method to form a thin film.

Two temperatures,. i.e. 20° C. and 40° C. were selected for the temperature of the substrate, and two temperatures, i.e. 0° C. and 40° C. were selected for the temperature of the casting. The intensity of the circularly polarized light (CD) of the thin film thus obtained is shown in FIG. 6.

Figure 6:
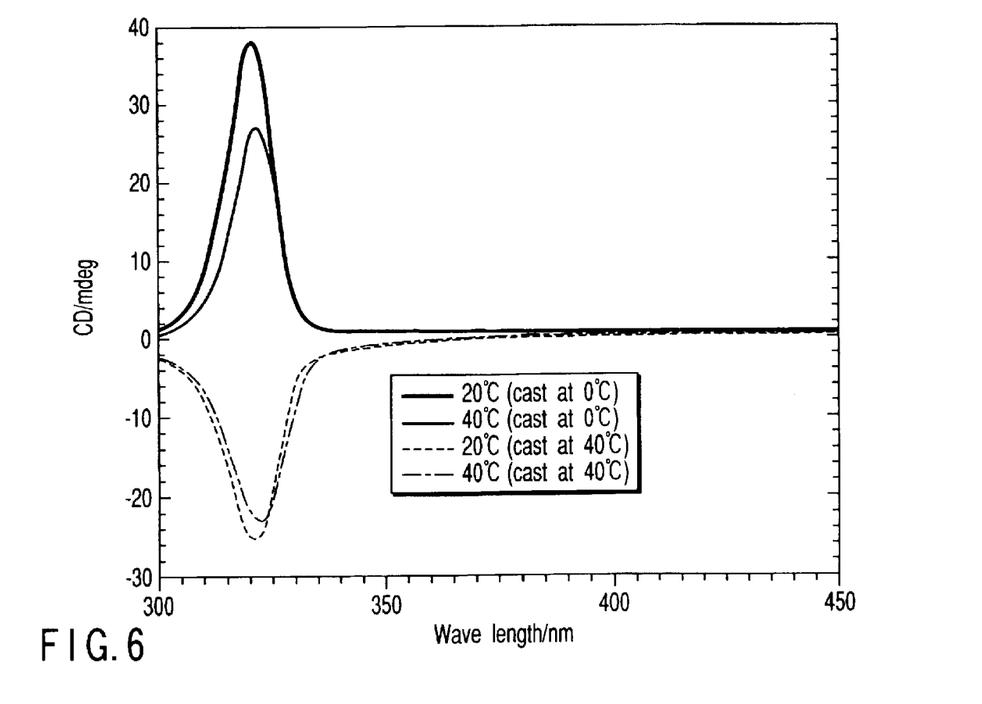
FIG. 6 is a graph illustrating the intensity of the circularly polarized light of a thin film containing a copolymer (RS-Oxa (85:15))

As shown in FIG. 6, when the casting was performed at a temperature of 0° C., a positive Cotton CD absorption band was observed in the vicinity of 320 nm. On the other hand, when the casting was performed at a temperature of 40° C., a negative Cotton CD absorption band was observed in the vicinity of 320 nm. In both cases, the absorption band was not dependent on the temperature of the substrate. It was confirmed through these results that the optical activity of the thin film containing the copolymer (RS-Oxa (85:15)) which was obtained through the casting at a temperature of 0° C. could be reversed in sign from that of the optical activity of the thin film which was obtained through the casting at a temperature of 40° C.

Figure 7:
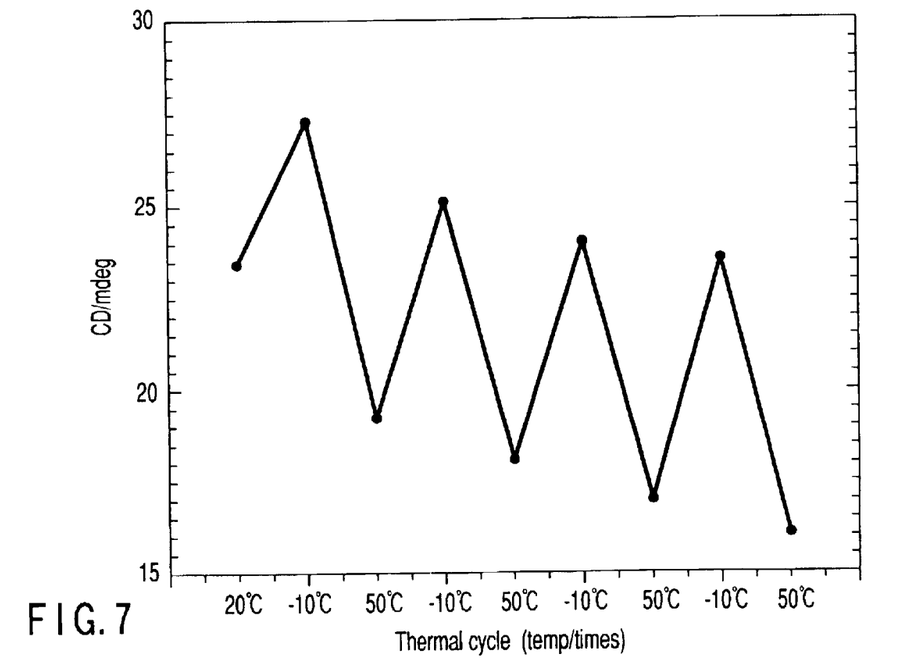
FIG. 7 is a graph illustrating the intensity of the circularly polarized light of a thin film containing a copolymer (RS-Oxa (85:15)) after the heat cycling of the thin film.

Then, the thin film obtained from the casting at a temperature of 0° C. was subjected to a heat cycle test to measure the intensity of the circularly polarized light of the thin film, the results being shown in the graph of FIG. 7. The graph indicates that the intensity of the circularly polarized light could be increased by cooling the thin film from 20° C. down to −10° C. On the other hand, when the thin film was heated from −10° C. up to 50° C. for example, the intensity of the circularly polarized light was caused to decrease. These changes were brought about reversibly. At either of these temperatures, it was possible to observe the peak of the intensity of the circularly polarized light by using a wavelength of about 320 nm.

As already explained above with reference to the graphs of FIGS. 3 and 4, the helix inversion temperature of the copolymer (RS-Oxa (85:15)) was in the vicinity of 38° C. Since the upper limit temperature of the heat cycle in this case was set to 50° C., this temperature corresponds approximately to the helix inversion temperature +12° C. It was confirmed that when the heating of the thin film was performed within this temperature range, the intensity of the circularly polarized light could be substantially reversibly changed. Namely, this thin film can be utilized as a temperature-driving type optical switch material. It is generally known through experience that the phase transition temperature of a solid body is higher than that of a solution by a magnitude of about 80 to 100° C. Thus, when the upper limit temperature of the heat cycle is higher than the helix inversion temperature in a solid film by a magnitude of 100° C. or more, the changes of the optical characteristics thereof would be assumed as being irreversible. Since this can be assumed as being a thermally irreversible effect, it may he possibly utilized as a write-once type information recording optical material.

COMPARATIVE EXAMPLE

An RS homopolymer represented by the following chemical formula was prepared.

(RS)

The weight average molecular weight (Mw) of this RS homopolymer was found $2.7 \times 10^6$, and the distribution of the molecular weight (Mw/Mn) was 13.

This homopolymer was dissolved in iso-octane to prepare a solution of $2.5 \times 10^{-3}$ mol/L, which was then coated on the surface of a quartz substrate by a spin-coating method to form a thin film.

Two temperatures, i.e. 20° C. and 50° C. were selected for the temperature of the substrate, and the temperature of the casting was set to 5° C. The intensity of the circularly polarized light (CD) of the thin film thus obtained is shown in FIG. 8.

Figure 8:
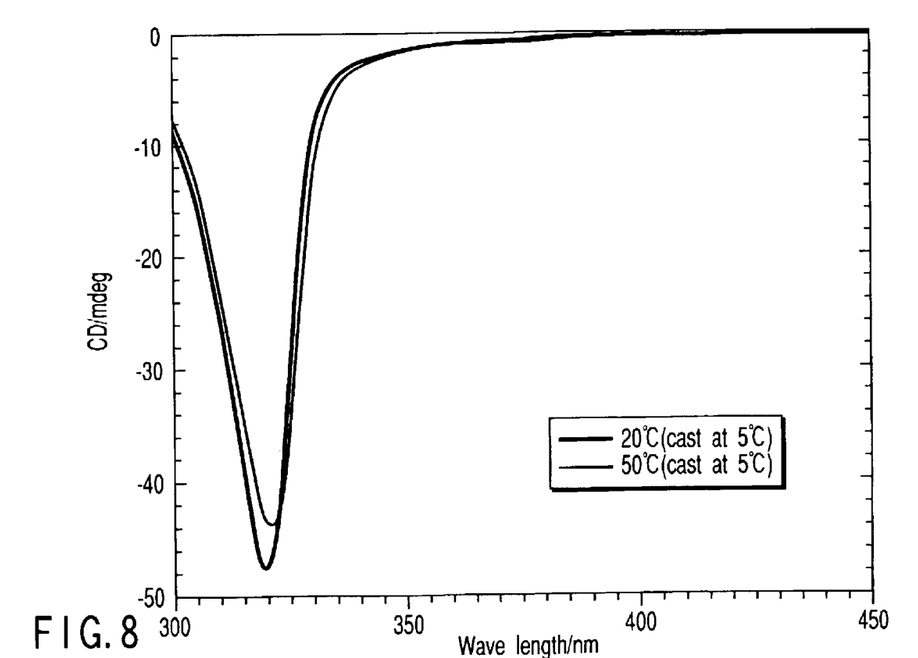
FIG. 8 is a graph illustrating the intensity of the circularly polarized light of a thin film containing an RS homopolymer.

As shown in FIG. 8, when the temperature of the substrate was 20° C., a negative Cotton CD absorption band was observed in the vicinity of 320 nm. Likewise, when the temperature of the substrate was 50° C., a negative Cotton CD absorption band was observed in the vicinity of 320 nm. It was confirmed through these results that when the casting was performed at a temperature of 5° C., the helical winding property of the RS homopolymer could not be changed, but only the pitch of the helix was allowed to change. As previously explained with reference to the graph of FIG. 3, the helix inversion temperature of this RS homopolymer was about 2° C., and it was impossible to bring about the inversion of helix when the casting temperature was 5° C. Although it is expected that if the casting temperature is lower than this helix inversion temperature, such as −10° C. or −5° C., the inversion of helix may be brought about. As a matter of fact however, casting at such a low temperature is very difficult in practice.

EXAMPLE 3

As an optically active polysilicone copolymer, a copolymer (RS-decyl (90:10)) represented by the following chemical formula was prepared.

(RS-decyl (90:10))

This compound was synthesized according to the following procedure.

First of all, the interior of a reaction vessel was sufficiently dehydrated and deaerated, and purged using argon gas. Thereafter, 1.66 g of metallic sodium, 0.3 mL of diglyme (diethylene glycol dimethyl ether), and 12 mL of toluene were introduced into a flask. Then, while keeping the oil bath temperature at 110° C. a mixture containing 8.7 g (90 mol %) of (R)-3,7-dimethyloctyl-(S)-3-methylpentyl dichlorosilane (MW: 325) and 1.85 g (10 mol %) of decylisobutyl dichlorosilane (MW: 309) was dropped little by little into the flask to activate the sodium. Thereafter, the temperature of the oil bath was lowered to 90° C., and all the remaining dichlorosilane was dropped into the flask. The reaction time required was three hours.

Thereafter, ethyl alcohol was added to the reaction solution to treat the unreacted sodium to obtain a reaction mixture, which was subsequently washed using ethyl alcohol and water, and subjected to suction filtration, thereby obtaining a white solid product. This solid product was redissolved in toluene to obtain a solution, which was then subjected to filtration to remove insoluble matter. Then, the solution thus filtered was subjected to fractional reprecipitation by using isopropanol and ethyl alcohol, thus refining the product and obtaining a white precipitate, which was then recovered by using a centrifugal separator. The resultant product was dried in a vacuum for 5 hours at a temperature of 90° C. to obtain the desired product, weighing 4.5 g. The yield was 46% as reduced to dichlorosilane monomer.

The weight average molecular weight (Mw) of the copolymer (RS-decyl (90:10)) was $1.0 \times 10^7$, and the distribution of the molecular weight (Mw/Mn) was 1.59.

This copolymer was dissolved in iso-octane to prepare a solution of $2.5 \times 10^{-3}$ mol/L, which was then coated on the surface of a quartz substrate by a spin-coating method to form a thin film.

Two temperatures, i.e. 20° C. and 50° C. were selected for the temperature of the substrate, and two temperatures, i.e. 0° C. and 30° C. were selected for the temperature of the casting. The intensity of the circularly polarized light (CD) of the thin film thus obtained is shown in the graph of FIG. 9.

Figure 9:
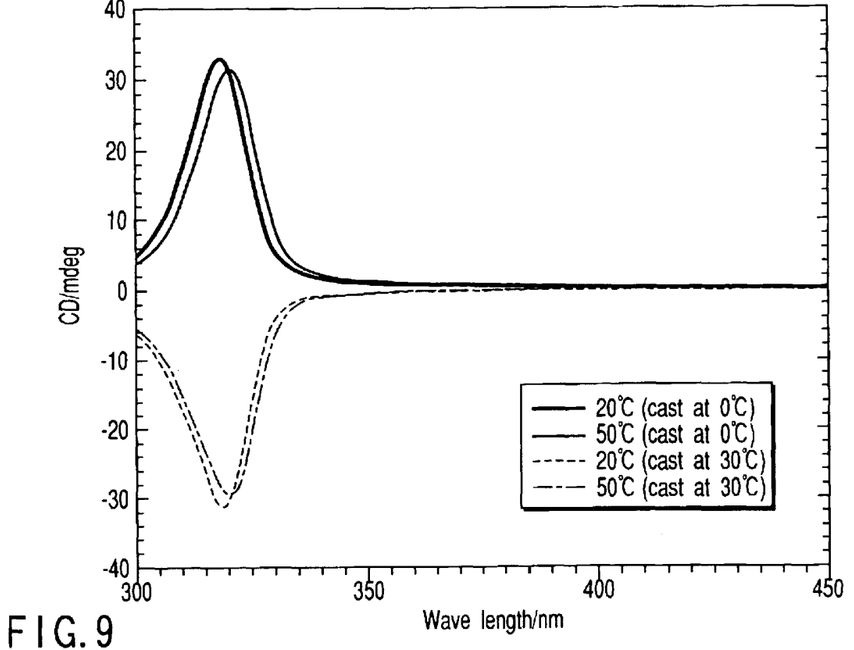
FIG. 9 is a graph illustrating the intensity of the circularly polarized light of a thin film containing a copolymer (RS-decyl (90:10))

As shown in FIG. 9, when the casting was performed at a temperature of 0° C., a positive Cotton CD absorption band was observed in the vicinity of 320 nm. On the other hand, when the casting was performed at a temperature of 30° C., a negative Cotton CD absorption band was observed in the vicinity of 320 nm. In both cases, the absorption band was not dependent on the temperature of the substrate. It was confirmed through these results that the optical activity of the thin film containing the copolymer (RS-decyl (90:10)) which was obtained through the casting at a temperature of 0° C. could be reversed in sign from that of the optical activity of the thin film which was obtained through the casting at a temperature of 30° C.

Figure 10:
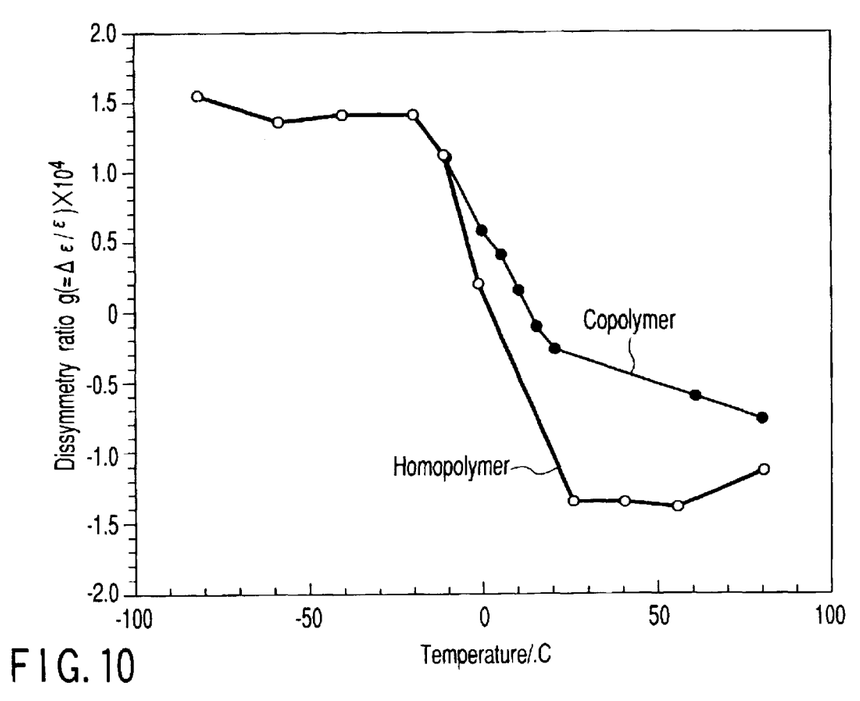
FIG. 10 is a graph illustrating the temperature dependency of an asymmetric factor.

The temperature dependency of the asymmetric factor with regard to an iso-octane solution of the copolymer (RS-decyl (90:10)) was measured. The results are shown in FIG. 10. FIG. 10 also shows the results obtained from an RS homopolymer.

It can be understood from the results shown in FIG. 10 that the asymmetric factor lowered as the temperature rose. Further, it is clear that the temperature which enables the asymmetric factor to become zero changes greatly depending on the composition of the polymer. More specifically, in the case of the copolymer (RS-decyl (90:10)), the asymmetric factor became zero at around 15° C., and in the case of the RS homopolymer, the asymmetric factor became zero at around 2° C. Namely, the helical inversion of each polymer takes place at a temperature specific to each polymer.

Figure 11:
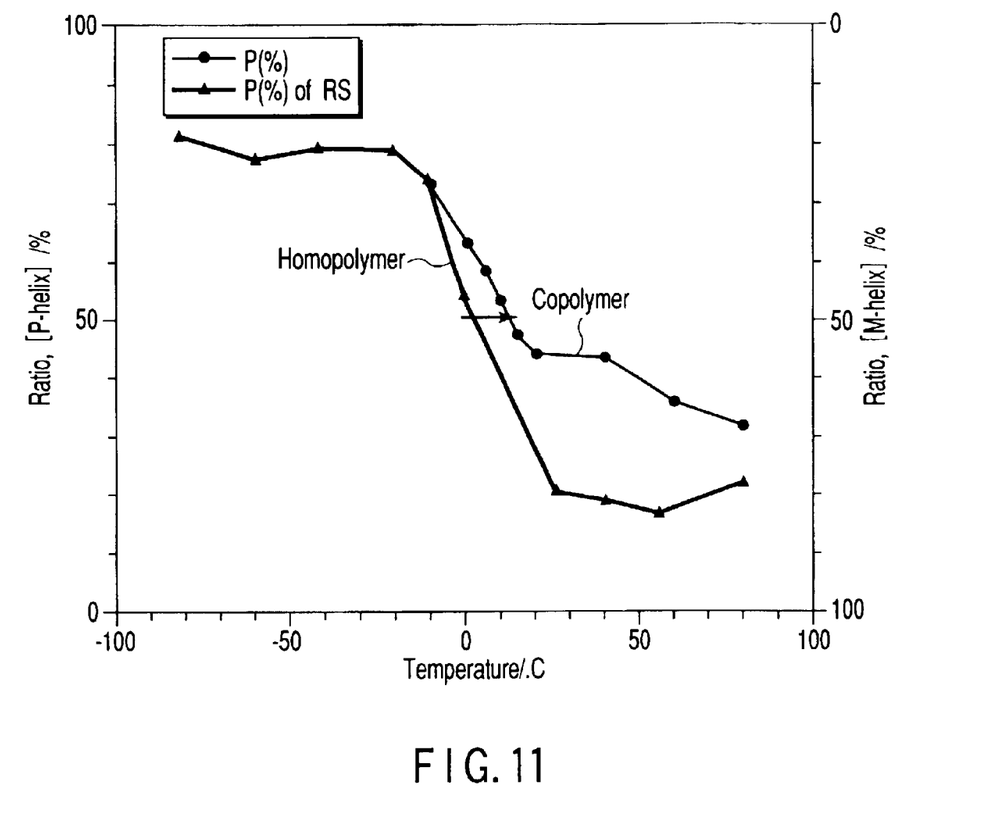
FIG. 11 is a graph illustrating the temperature dependency of the content of a right-hand helical structure and of a left-hand helical structure.

The content of the right-hand helical structure and of the left-hand helical structure in copolymer (RS-decyl (90:10)) and RS homopolymer was found to be dependent on the temperature and fluctuated as shown in the graph of FIG. 11.

As explained above, it is possible, according to one aspect of the present invention, to provide an optically active polysilane which is capable of exhibiting signals of large circular dichroism in a highly efficient manner over a wide range of wavelengths, covering ultraviolet, visible and near infrared, and to provide an optically active film formed using this polysilane. It is also possible, according to another aspect of the present invention, to provide a method of controlling the optical activity of a solid thin film relative to a light source selected suitably in conformity with a wide range of wavelengths, covering ultraviolet, visible and near infrared.

According to the present invention, it is now possible to realize a thin film material which is capable of performing thermal writing and optical reading, and will also be capable of thermal and optical erase in the future. Furthermore, it is possible with this thin film material to bring about a large magnitude of changes in optical rotation as a result of writing. Therefore, this thin film will lead to the realization of an all-optical recording system, as well as a higher recording density, and writing and reading at a speed comparable to that of a hard disk, thus rendering this invention industrially valuable.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

What is claimed is:

1. An optically active polysilane represented by the following general formula:

(1)

wherein $R^1$ and $R^2$ are a combination of groups selected from (R)-3,7-dimethyloctyl group and (S)-3-methylpentyl group, (S)-3,7-dimethyloctyl group and (R)-3-methylpentyl group, (S)-3,7-dimethyloctyl group and isopentyl group, (R)-3,7-dimethyloctyl group and isopentyl group, (S)-3,7-dimethyloctyl group and 2-ethylbutyl group, (R)-3,7-dimethyloctyl group and 2-ethylbutyl group, (S)-3,7-dimethyloctyl group and 2-cyclopentylethyl group, and (R)-3,7-dimethyloctyl group and 2-cyclopentylethyl group; $R^3$ is an alkyl group having 3 to 20 carbon atoms and formed of a branched structure which is branched at any one of the first to fourth carbon atoms positioned away from the backbone chain; $R^4$ is a straight-chain alkyl ether group having 2 to 22 carbon atoms, or a straight-chain alkyl group having 2 to 22 carbon atoms; x is a number ranging from 0.01 to 0.99; and wherein the number or repeating units in the optically active polysilane as represents by formula (1) ranges from 10 to 100,000.

2. The optically active polysilane according to claim 1, wherein said x in the general formula (1) is 0.5 or less.

3. The optically active polysilane according to claim 1, wherein said x in the general formula (1) is 0.25 or less.

4. The optically active polysilane according to claim 1, wherein said $R^3$ in the general formula (1) is, isobutyl group, and said $R^4$ in the general formula (1) is 6,9,12-trioxatetradecyl group.

5. The optically active polysilane according to claim 4, wherein said x in the general formula (1) is 0.05.

6. The optically active polysilane according to claim 4, wherein said x in the general formula (1) is 0.15.

7. The optically active polysilane according to claim 1, wherein said $R^3$ in the general formula (1) is isobutyl group, and said $R^4$ in the general formula (1) is decyl group.

8. The optically active polysilane according to claim 7, wherein said x in the general formula (1) is 0.1.

9. The optically active polysilane according to claim 1, wherein the helical inversion temperature of the polysilane in a solution of iso-octane is higher than 2° C. and not higher than 100° C.

10. An optically active film containing the polysilane represented by the following general formula (1):

wherein $R^1$ and $R^2$ are a combination of groups selected from (R)-3,7-dimethyloctyl group and (S)-3-methylpentyl group, (S)-3,7-dimethyloctyl group and (R)-3-methylpentyl group, (S)-3,7-dimethyloctyl group and isopentyl group, (R)-3,7-dimethyloctyl group and isopentyl group, (S)-3,7-dimethyloctyl group and 2-ethylbutyl group, (R)-3,7-dimethyloctyl group and 2-ethylbutyl group, (S)-3,7-dimethyloctyl group and 2-cyclopentylethyl group, and (R)-3,7-dimethyloctyl group and 2-cyclopentylethyl group; $R^3$ is an alkyl group having 3 to 20 carbon atoms and formed of a branched structure which is branched at any one of is the first to fourth carbon atoms positioned away from the backbone chain; $R^4$ is a straight-chain alkyl ether group having 2 to 22 carbon atoms, or a straight-chain alkyl group having 2 to 22 carbon atoms; x is a number ranging from 0.01 to 0.99; and wherein the number or repeating units in the optically active polysilane as represents by formula (1) ranges from 10 to 100,000.

11. The optically active film according to claim 10, wherein said x in the general formula (1) is 0.5 or less.

12. The optically active film according to claim 10, wherein said x in the general formula (1) is 0.25 or less.

13. The optically active film according to claim 10, wherein said $R^3$ in the general formula (1) is isobutyl group, and said $R^4$ in the general formula (1) is 6,9,12-trioxatetradecyl group.

14. The optically active film according to claim 13, wherein said x in the general formula (1) is 0.05.

15. The optically active film according to claim 13, wherein said x in the general formula (1) is 0.15.

16. The optically active film according to claim 10, wherein said $R^3$ in the general formula (1) is isobutyl group, and said $R^4$ in the general formula (1) is decyl group.

17. The optically active film according to claim 16, wherein said x in the general formula (1) is 0.1.

18. The optically active film according to claim 10, wherein the intensity of the circularly polarized light of said film decreases when said film is heated, and that the intensity of the circularly polarized light of said film increases when said film is cooled.

19. A method of controlling the optical activity of a solid thin film, said method comprising:
    forming a thin film containing an optically active polysilane represented by the following general formula (1) and exhibiting a helical inversion on a substrate at a temperature which is low enough to prevent the generation of said helical inversion:
    heating said thin film to decrease the intensity of the circularly polarized light of said thin film; and
    cooling said thin film to increase the intensity of the circularly polarized light of said thin film:

wherein $R^1$ and $R^2$ are a combination of groups selected from (R)-3,7-dimethyloctyl group and (S)-3-methylpentyl group, (S)-3,7-dimethyloctyl group and (R)-3-methylpentyl group, (S)-3,7-dimethyloctyl group and isopentyl group, (R)-3,7-dimethyloctyl group and isopentyl group, (S)-3,7-dimethyl-octyl group and 2-ethylbutyl group, (R)-3,7-dimethyloctyl group and 2-ethylbutyl group, (S)-3,7-dimethyloctyl group and 2-cyclopentylethyl group, and (R)-3,7-dimethyloctyl group and 2-cyclopentylethyl group; $R^3$ is an alkyl group having 3 to 20 carbon atoms and formed of a branched structure which is branched at any one of the first to fourth carbon atoms positioned away from the backbone chain; $R^4$ is a straight-chain alkyl ether group having 2 to 22 carbon atoms, or a straight-chain alkyl group having 2 to 22 carbon atoms; x is a number ranging from 0.01 to 0.99; and wherein the number or repeating units in the optically active polysilane as represents by formula (1) ranges from 10 to 100,000.

20. The controlling method according to claim 19, wherein said x in the general formula (1) is 0.5 or less.

21. The controlling method according to claim 19, wherein said x in the general formula (1) is 0.25 or less.

22. The controlling method according to claim 19, wherein said $R^3$ in the general formula (1) is isobutyl group, and said $R^4$ in the general formula (1) is 6,9,12-trioxatetradecyl group.

23. The controlling method according to claim 22, wherein said x in the general formula (1) is 0.05.

24. The controlling method according to claim 22, wherein said x in the general formula (1) is 0.15.

25. The controlling method according to claim 19, wherein said $R^3$ in the general formula (1) is isobutyl group, and said $R^4$ in the general formula (1) is decyl group.

26. The controlling method according to claim 25, wherein said x in the general formula (1) is 0.1.

27. The controlling method according to claim 19, wherein the helix inversion temperature of the polysilane in a solution of iso-octane is higher than 2° C. and not higher than 100° C.

* * * * *